United States Patent
Jans et al.

(10) Patent No.: US 10,863,727 B2
(45) Date of Patent: Dec. 15, 2020

(54) METHOD FOR AUTOMATIC SEA LICE MONITORING IN SALMON AQUACULTURE

(71) Applicant: Intervet Inc., Madison, NJ (US)

(72) Inventors: Peter Jans, De Rips (NL); Evert Gijtenbeek, Wijchen (NL)

(73) Assignee: Intervet Inc., Madison, NJ (US)

( * ) Notice: Subject to any disclaimer, the term of this patent is extended or adjusted under 35 U.S.C. 154(b) by 199 days.

(21) Appl. No.: 15/767,888

(22) PCT Filed: Oct. 21, 2016

(86) PCT No.: PCT/EP2016/075385
§ 371 (c)(1),
(2) Date: Apr. 12, 2018

(87) PCT Pub. No.: WO2017/068127
PCT Pub. Date: Apr. 27, 2017

(65) Prior Publication Data
US 2018/0303073 A1    Oct. 25, 2018

(30) Foreign Application Priority Data
Oct. 22, 2015 (EP) .................................... 15191108

(51) Int. Cl.
*A01K 61/13* (2017.01)
*A01K 61/60* (2017.01)
*A01K 61/90* (2017.01)

(52) U.S. Cl.
CPC .............. *A01K 61/60* (2017.01); *A01K 61/13* (2017.01); *A01K 61/90* (2017.01); *Y02A 40/81* (2018.01)

(58) Field of Classification Search
CPC ........ A01K 61/10; A01K 61/90; A01K 61/60; A01K 61/13; A01M 1/026; A01M 1/145
USPC ........................................................... 119/223
See application file for complete search history.

(56) References Cited

U.S. PATENT DOCUMENTS

| | | | |
|---|---|---|---|
| 2005/0025357 A1* | 2/2005 | Landwehr | A01M 1/026 382/170 |
| 2013/0050465 A1* | 2/2013 | Beck | A01K 61/10 348/81 |

(Continued)

FOREIGN PATENT DOCUMENTS

| | | | |
|---|---|---|---|
| EP | 2962556 A1 * | 1/2016 | A61D 3/00 |
| EP | 2962556 A1 | 1/2016 | |

(Continued)

OTHER PUBLICATIONS

Cox et al., A Report to Havbruksinstituttet AS and FHF Norway, Population Interpretation of Passive Sea Lice Monitoring, Mar. 2013, pp. 1-22.

(Continued)

*Primary Examiner* — Yvonne R Abbott-Lewis
(74) *Attorney, Agent, or Firm* — David J. Kerwick

(57) ABSTRACT

The present invention pertains to a method for automatic sea lice monitoring in fish aquaculture, the method comprising submerging a camera (4) in a sea pen (300) comprising fish, using the camera to make an image of at least one of said fish, analysing the image to differentiate between individual sea lice present on the fish and the fish itself and assessing the number of sea lice present on the fish, wherein the camera is attached to a device (1, 10, 100) for guiding the salmon along an imaging track (5), the camera being directed to the track.

18 Claims, 3 Drawing Sheets

(56) References Cited

U.S. PATENT DOCUMENTS

Figure 1A:
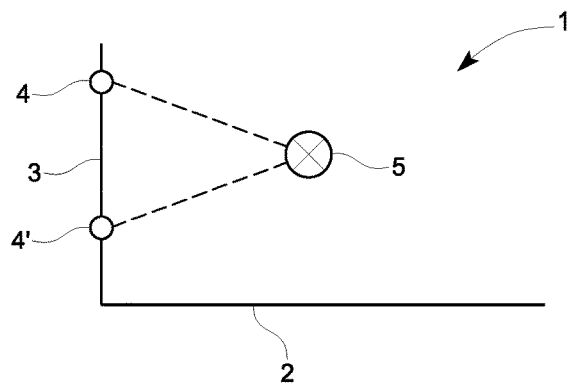

| | | | | |
|---|---|---|---|---|
| 2018/0000055 A1* | 1/2018 | Tanase | ............ | A01K 63/06 |
| 2019/0302265 A1* | 10/2019 | Jansson | ............ | G01S 7/4802 |

FOREIGN PATENT DOCUMENTS

| | | | |
|---|---|---|---|
| ES | 2552405 A1 | 11/2015 | |
| NO | 342604 B1 | 6/2018 | |
| WO | 2005025309 A1 | 3/2005 | |
| WO | 2009008733 A1 | 1/2009 | |
| WO | 2011115496 A1 | 9/2011 | |
| WO | 331345 B1 | 12/2011 | |
| WO | 332103 B1 | 6/2012 | |
| WO | WO2014204319 A1 | 12/2012 | |
| WO | WO2013053597 A1 | 4/2013 | |
| WO | WO2014098614 A1 | 6/2014 | |
| WO | WO2014198556 A1 | 12/2014 | |
| WO | WO2015009160 A1 | 1/2015 | |
| WO | 2016048851 A1 | 3/2016 | |
| WO | 2016116533 A1 | 7/2016 | |
| WO | 2017068127 A1 | 4/2017 | |
| WO | 2017204660 A1 | 11/2017 | |
| WO | 2018222048 A1 | 12/2018 | |
| WO | 2019121844 A1 | 6/2019 | |
| WO | 2019121851 A1 | 6/2019 | |
| WO | 2019121854 A1 | 6/2019 | |
| WO | 2019121887 A1 | 6/2019 | |
| WO | 2019121900 A1 | 6/2019 | |

OTHER PUBLICATIONS

Extended European Search Report for 15191108.0 dated Apr. 12, 2016.

International Search report for PCT/EP2016/075385 dated Jan. 17, 2017, 14 pages.

Aaen, et al., Drug resistance in sea lice: a threat to salmonid aquaculture, 2015, pp. 72-81, vol. 31, No. 2.

B. Saugen, Optical Sorting of Farmed Salmon from Rivers, Experience from the River Suldalslag in 2012, 2013, Powerpoint slides 1-20, -, BioSort AS.

Fallang, A., Evidence for occurrence of an organophosphate-resistant type of acetylcholinesterase in strains of sea lice (*Lepeophtheirus salmonis* Kroyer), 2004, pp. 1163-1170, vol. 60.

Greaker, M., Environmental policy and innovation in Norwegian fish farming: Resolving the sea lice problem?, 2020, pp. 1-10.

Lam, C.T., Sea lice exposure to non-lethal levels of emamectin benzoate after treatments: a potential risk factor for drug resistance, 2020, pp. 1-8, Scientific Reports.

Machine translation for Norwegian Patent NO332103B1.

Machine translation for Sanish Patent ES2552405A1.

Marine Scotland, The Regulation of Sea Lice in Scotland, 2019, Topic Sheet No. 71, pp. 1-2, Scottish Government Riaghaltas.

Naval, P.C., and David, L.T., FishDrop: Estimation of Reef Fish Population Density and Biomass using Stereo Cameras, Techno-Ocean, 2016, pp. 527-531, 4B.2.

Powerpoint report BioSort 2013, Optical sorting of farmed salmon from river, experiences from Suldalslagen 2012.

Ramsden, N., Norway's salmon farmers spent over NOK 5bn on sea lice treatments in 2015, Mar. 2016, pp. 1-3, Undercurrent News.

The Guardian, Salmon farming in crisis: 'We are seeing a chemical arms race in the seas', 2016, pp. 1-5.

Tillett, et al., An optical method for the detection of sea lice, *Lepeophtheirus salmonis*, Aquacultural Engineering, 1999, pp. 33-48, 21.

Worldwide Aquaculture, Sealice, 2020, pp. 1-2.

* cited by examiner

METHOD FOR AUTOMATIC SEA LICE MONITORING IN SALMON AQUACULTURE

CROSS-REFERENCE TO RELATED APPLICATIONS

This application is a national stage entry under 35 U.S.C. § 371 of PCT/EP2016/075385, filed on Oct. 21, 2016, which claims priority to EP Application No. 15191108.8, filed on Oct. 22, 2015; the content of EP15191108.8, is hereby incorporated by reference in its entirety.

GENERAL FIELD OF THE INVENTION

The present invention pertains to a method for automatic sea lice monitoring in fish aquaculture, such as salmon aquaculture, the method comprising submerging a camera in a sea pen comprising salmons, using the camera to make an image of at least one of said salmons, analysing the image to differentiate between individual sea lice present on the fish, such as salmon and the fish itself, and assessing the number of sea lice present on the salmon. The invention also pertains to a system for use in fish aquaculture to automatically monitor and report sea lice presence on fish, and to a device for making images of fish present in a sea pen.

BACKGROUND ART

Regular and accurate sea lice monitoring is a vital component to any effective integrated pest management regime targeted against one of the most costly ectoparasitic pathogens associated with modern fish aquaculture such as salmon aquaculture. In most regions with substantial cultured salmon production, sea lice (mainly *Lepeophtheirus salmonis* and various *Caligus* species) continue to be one of the most important fish health concerns. Even in regions where significant infestations tend not to be experienced, such as British Columbia or the far north of Norway, it is important to monitor sea lice levels to mitigate any potential negative impacts for wild salmon. In addition to regular monitoring, the recent emergence in a number of regions of tolerance to certain chemotherapeutants has emphasised the importance of methods to obtain accurate sea lice estimates before and after treatment to properly assess the efficacy of any medication being used so as to gain early warning of tolerance issues. However, to date, this involves a manual process which is time consuming and dependent for its accuracy on the skill of the individual carrying out the count and their ability to access a range of sea pens. Crowding fish within pens to select a representative sample also imposes stress on these fish. Because of the time required only a small number of fish can be sampled. However as lice numbers have been driven down over the past decade, increasingly large samples are required to maintain the statistical reliability of any population-level estimates.

The use of underwater imaging has therefore been proposed as an automated and passive counting system. Creating an image of a fish such as salmon covered by sea lice (which image may be part of a video, which video technically is a series of images) provides the possibility of automatically monitoring the number of sea lice on fish. It is possible to differentiate between individual sea lice present on a fish such as salmon and the (skin of the) fish or salmon itself, thus to distinguish between individual sea lice present on the skin of a fish or salmon and the skin of the fish or salmon itself. This way, the number of sea lice present on one fish or salmon can be assessed. One of the key projects to practically develop such an imaging method was the Eurostars *VisuaLice* project, which was a follow up innovation of a pilot study by Scottish researchers in 2005-2007. As stated in the Executive Summary of the 2013 report of *VisuaLice* (*Population Interpretation of Passive Sea Lice Monitoring*, authors Cox and Revie) to the Havbruksinstituttet and FHF Norway, such a system can offer the benefits of enhanced repeatability and accuracy, larger sample sizes, continuous monitoring, lower costs and lower levels of disturbance to the fish. It was therefore proposed in the project to develop such a system to assess the relative value of this novel approach in comparison to traditional manual counting. However, although it appeared to be possible to distinguish individual sea lice present on the skin of a fish or salmon using commonly known imaging techniques, results from experiments and field trials of the underwater imaging system were largely unsuccessful.

OBJECT OF THE INVENTION

It is an object of the invention to devise a method for automatic sea lice monitoring that can successfully be used to assess the number of sea lice present on fish such as salmons present in sea pen. It is another object of the invention to devise a system for use in fish aquaculture such as salmon aquaculture to automatically monitor and report sea lice presence on salmons.

SUMMARY OF THE INVENTION

In order to meet the first object of the invention, a method as outlined in the GENERAL FIELD OF THE INVENTION section here above has been devised, wherein the camera is attached to a device for guiding the fish such as salmon along an imaging track, the camera being directed to the track. Using a prior art method, the principal problem is not that sea lice cannot be distinguished on a fish such as salmon for accurate counting, the problem is that the fish do not appear on the images in a standardised way, for example, the angle and distance may vary considerably depending on the spatial relationship between the camera and the fish at the time of making an image. Also, in many instances far too many fish appear on an image, partly overlapping each other. This on the one hand makes the automatic sea lice monitoring less easy, but more importantly, may prevent that a complete side surface of a fish such as a salmon can be assessed. All of this contributes to less reliability.

By using the device as specified, the camera holds a predetermined position with respect to an imaging track (i.e. a path or line along which a fish or salmon may swim, to which path or line the camera is directed to be able and image the fish or salmon when actually passing). Even though the track may be wider than the width of just one fish such as salmon, this way the imaging of the fish may take place with substantially improved reliability. This is because the distance and orientation of the fish with respect to the camera is better controlled when compared to a method wherein a camera is simply submerged in the sea, without being spatially positioned with respect to an imaging track and thus, with respect to a fish such as salmon to be imaged. Also, the chance that an image of fish overlapping each other is decreased, which also contributes to an improved reliability of the automatic monitoring method.

In order to meet the second object of the invention a system is devised comprising a central processing unit (CPU), and connected to the CPU a camera submerged in a sea pen comprising the fish such as salmons, the camera being devised to make images of said fish or salmons, wherein the camera is attached to a device for guiding the fish or salmons along an imaging track of this device, the camera being directed to the track, imaging software running on the CPU to analyse images of the fish or salmons made by the camera, to differentiate between individual sea lice present on each of the said fish or salmons and the fish or salmons themselves, and to assess the number of sea lice present on the fish or salmons, and a reporting unit connected to the CPU, to display a results corresponding to said assessing. This system makes use of the same advantages of the imaging device as described here above.

The invention also enables the use of a device for making images of fish and especially salmons present in a sea pen, the device comprising a track for guiding a fish or salmon through the device, the device comprising an enclosure that confines the track, wherein the camera is attached to the enclosure and directed to the track.

Definitions

Automatic means without requiring operator intervention to perform the action. This does not exclude that an automatic action may be initiated (for example requested), intervened or terminated by an operator.

Radial means heaving walls or borders arranged around a centre.

Assessing a number of items means to create a parameter that corresponds to that number of items, for example by explicitly counting the number of items or by establishing the total weight of the items.

A central processing unit is a hardware system, programmed to process data. The hardware does not need to be one single unit, but may comprise several distributed units operatively connected via for example wireless connections.

An enclosure of a track means that the items that should pass the track cannot freely cross the enclosure. This does not include that other material (for example units smaller than the items, or a liquid or gas) can cross the enclosure.

A camera being directed to an item means that the camera is positioned to be able and make an image of that item or a second item positioned in a straight line between the camera and the said first item.

EMBODIMENTS OF THE INVENTION

In an embodiment of the invention the device comprises a radial enclosure to confine the track. It was found that a very convenient and reliable way of guiding a fish, such as salmon along an imaging track is to use a device that radially confines the track. The width of the opening should be chosen such that the salmon is typically not hindered in swimming along the track, but also, not too big to prevent improper guidance. The actual measures to allow a fish or salmon to swim through the device, and still give adequate guidance is believed to depend mainly on the age (size) of the fish or salmons and the density of the fish or salmons in the pen. Good results were obtained when the radial enclosure has a diameter or diagonal that is about 90-150% of the girth of the fish. The girth of the fish is the distance of the circumference of the fish going round the fish from the back to belly and back to the back of the fish and is the distance around the fattest, thickest or biggest part of the fish, which is usually the midsection. Girth may be measured with a fabric ruler, or using a string, and then measuring the length of the string. Preferably, the diameter or diagonal of the enclosure is 90-150% of the girth of the fish. More preferably, the diameter or diagonal of the enclosure is 100-140% of the girth of the fish, more preferably, the diameter or diagonal of the enclosure is 105-130% of the girth of the fish, more preferably, the diameter or diagonal of the enclosure is 110-125% of the girth of the fish, more preferably, the diameter or diagonal of the enclosure is 115-120% of the girth of the fish. The above measures ensure the free movement of the fish, and the fish will swim freely along track, without needing any force. It is important for the fish to swim freely, into the device to avoid any stress. If no force is needed for the fish to swim into the device and along the track, then the fish will experience less stress, which is beneficial and no additional devices are needed to force the fish into the device and along the track. The above measures also ensure that the fish swim through the enclosure one by one, thereby avoiding overlap of fish that will compromise the counting. In addition, the above measures have the benefit that the fish will swim through the enclosure in an uniform way. This has the advantage that the cameras may be aligned in the most beneficial way to count the sea lice and that for each fish the sea lice are counted at the same part of the fish for each fish, thus ensuring uniform and thus reliable counting.

In another embodiment the enclosure is circular enclosure. A circular enclosure is easier to position evenly around a longitudinal imaging track, increasing the reliability of the method. In yet another embodiment the enclosure is endless along its circumference, i.e. not having an opening to interrupt the circumference. This provides for an improved stability of the device. In still another embodiment the device is a circular frame. Such a frame has been found ideally suitable to guide a fish such a salmon over a track corresponding to the axis of the frame. For a circular enclosure preferably, the diameter of the circular enclosure is 90-150% of the girth of the fish. More preferably, the diameter of the circular enclosure is 100-140% of the girth of the fish, more preferably, the diameter of the circular enclosure is 105-130% of the girth of the fish, more preferably, the diameter of the circular enclosure is 110-125% of the girth of the fish, more preferably, the diameter of the circular enclosure is 115-120% of the girth of the fish.

In an embodiment the device is spatially fixed with regard to one or more walls of the sea pen. Would the device be mechanically connected to a float, the submerged device would bounce with the amplitude of the waves. It is foreseen that this creates too much disturbance around the device, possibly keeping the salmons away from taking the imaging track (depending on the amplitude of the waves). By spatially fixing the device with respect to one or more walls of the pen, for example with respect to the bottom of the pen using an anchor that grasps this bottom, this potential problem may not arise.

In another embodiment the device comprises at least two cameras directed to the track. Using two or more cameras enables a greater surface of the salmon to be images, thereby increasing the reliability of the assessment of the number of sea lice present on the salmon.

In still another embodiment the device is provided with a thermometer to record the sea water temperature at the time the image is made. The seat water temperature is an important factor in sea lice infestations. By recording the sea water temperature, the relation between temperature and sea lice infestations can be better assessed.

In yet another embodiment, in addition to the number of sea lice present on the fish such as salmon, the size of these lice is assessed. This way, information about the stage of life of the sea lice can be obtained. This can be important information to optimize combating an infestation of sea lice in a pen.

Another aspect of the invention is directed to a system for use in fish aquaculture to automatically monitor and report sea lice presence on fish, the system comprising a central processing unit (CPU; 200)

connected to the CPU a camera submerged in a sea pen comprising the fish, the camera being devised to make images of said fish, wherein the camera is attached to a device for guiding the fish along an imaging track of this device, the camera being directed to the track, imaging software running on the CPU to analyse images of the fish made by the camera, to differentiate between individual sea lice present on each of the said fish and the fish themselves, and to assess the number of sea lice present on the fish, a reporting unit (204, 206) connected to the CPU, to display a results corresponding to said assessing.

Another aspect of the invention is directed to a device for making images of fish present in a sea pen, the device comprising a track for guiding a fish through the device, the device comprising an enclosure that confines the track, wherein the camera is attached to the enclosure and is directed to the track.

Optionally the enclosure is a radial enclosure (11, 101) to confine the track. Optionally the enclosure has a diameter or a diagonal having a length that is 90-150% of the girth of the fish. Optionally the enclosure is a circular enclosure. Optionally the enclosure is endless along its circumference. Optionally the enclosure is a circular frame (101).

The method, device and system of the present invention are especially well-suited for aquaculture where the fish are cultured in open water such as salmon and trout, and especially for salmon.

Embodiments and/or features as indicated for the method are expressly envisioned as embodiments for the device and/or system.

For the sake of conciseness not every combination of embodiments and/or optional features are described herein, however each combination of embodiments and/or described features are expressly envisioned in the present invention.

The invention will now be further explained using the following examples.

EXAMPLES

FIG. 1 shows devices for use in the present method.

Figure 2:
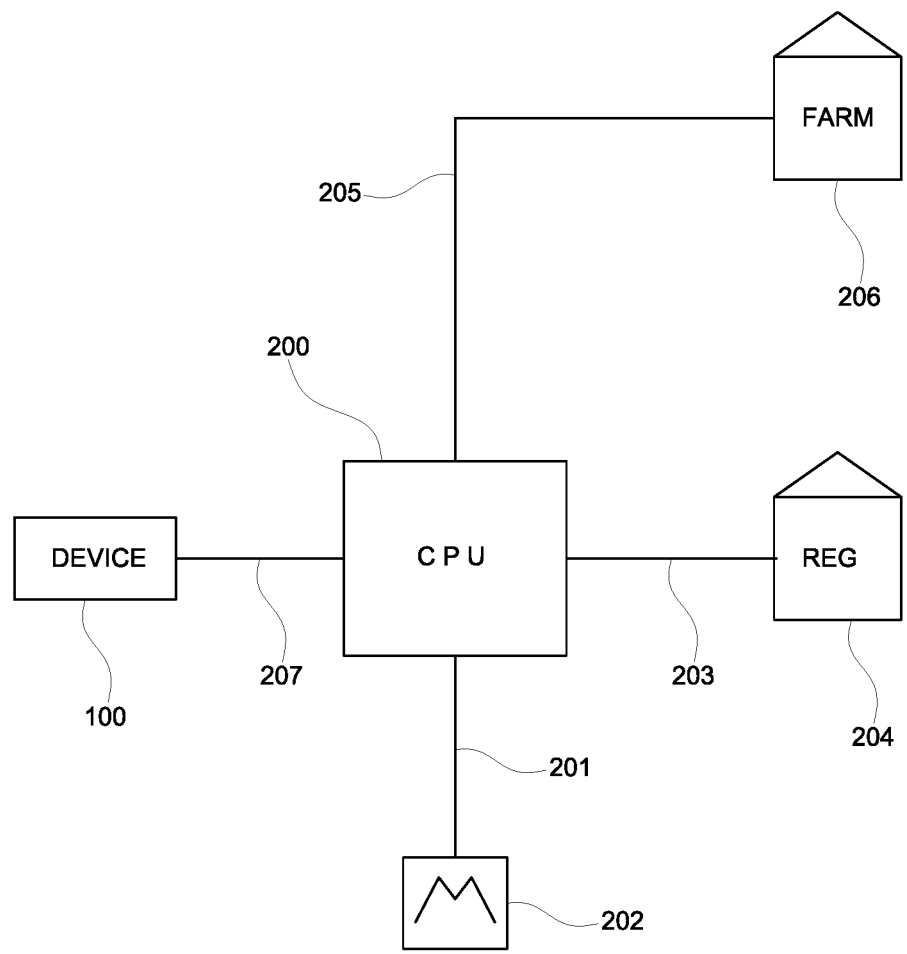

FIG. 2 schematically shows a system according to the invention.

Figure 3:
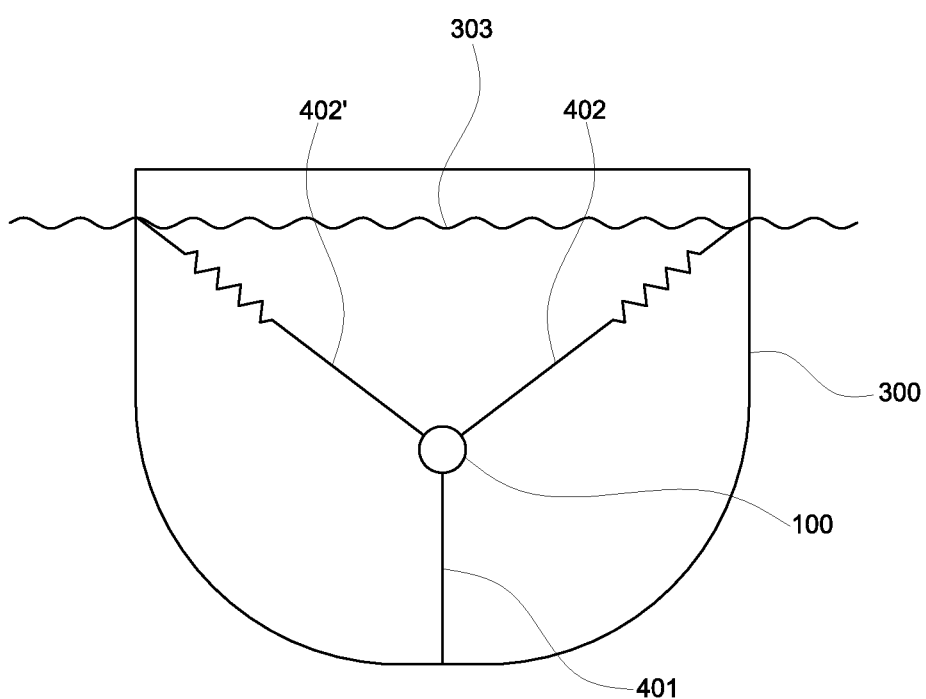

FIG. 3 shows a device according to the invention, spatially fixed with regard to the walls of a sea pen for cultivating salmons.

FIG. 1

FIG. 1 shows three devices for use in the present method. In FIG. 1A a simple open triangle 1 is depicted, comprising two legs 2 and 3, having a length of about 50 cm. Within the try square of the triangle, imaging track 5 (which is viewed from the back in this figure) is depicted. Cameras 4 and 4' are directed to this track. The triangle legs will typically prevent that salmons will swim very close to the legs, they will keep a certain distance. This distance is such that it coincides with the distance between the track and the two legs. This way, occasionally a salmon will swim along the imaging track. Upon passing the cameras, one or more pictures (or a short film) will be taken for image analysis.

Figure 1B:
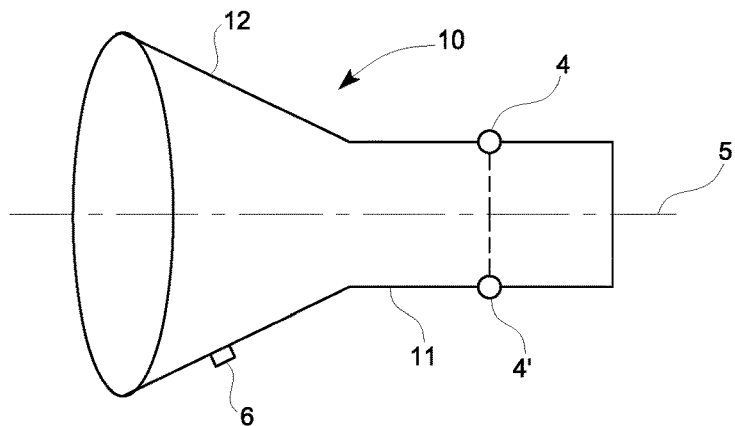

An improved device is depicted in FIG. 1B. This device 10 has as a core part a cylindrical tube 11, which tube represents a radial enclosure to confine the imaging track 5. At its distal end, the tube 11 is provided with a funnel 12 to guide a salmon towards the tube 11. The diameter of the core is such that a salmon will not enter the core at the non-funnel side, since the salmon will notice the walls of the tube (for a salmon of 3-4 kg this may be a diameter of about 20-25 cm). However, at the funnel side, once entered the device, a salmon will not turn when reaching the tube 11 and will swim through, in essence following the imaging track 5. Two cameras 4 and 4' are directed towards this track. The device is also equipped with a thermometer 6 to measure the temperature of the sea water at the time of taking pictures (images) of the salmon.

Figure 1C:
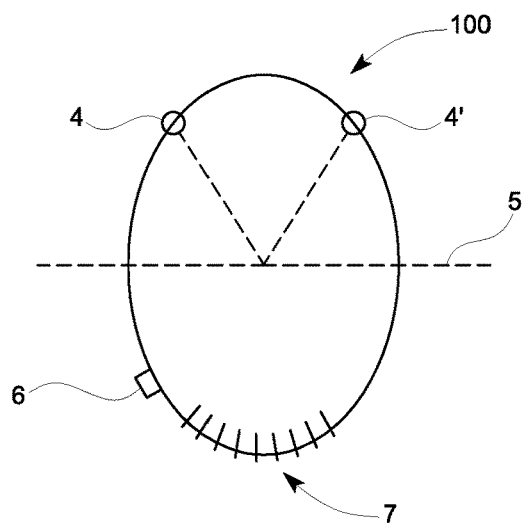

Another type of device is depicted in FIG. 1C. This device 100 comprises an endless circular frame enclosing an imaging track 5. To the frame are connected two cameras 4 and 4', and a thermometer 6, corresponding to the same elements as depicted in FIG. 1B. The diameter of the frame is chosen such that a salmon will swim through the device from either side and be guided in essence along (i.e. coinciding with or at least adjacent) the imaging track. For a salmon having a weight of 3-4 kg, a typical diameter is 40-60 cm (depending also on the density of salmons in the pen). In an embodiment (not shown), the frame is provided with means to adapt the circular width to the size of the salmons in a pen. At the bottom of the frame, indications of length 7 are provided to serve as a ruler.

In particular for the devices having a radially enclosure for the imaging track, smaller versions may be made to learn young salmons in hatcheries to get comfortable with swimming through the device. This may lead to an ultimate device (i.e. a device for use in the actual sea pen to grow the salmons) having minimum radial dimensions, thereby increasing the intrinsic reliability of the method.

FIG. 2

FIG. 2 schematically shows a system according to the invention. The system comprises a central processing unit (CPU) 200 and via data line 207 (which may be a wireless connection) connected to the CPU the device 100 (see FIG. 1C) submerged in a sea pen comprising the salmons (not shown; see FIG. 3). The cameras of the device 100 are devised to make images of the salmons when they swim along the corresponding imaging track. The CPU comprises imaging software running on the CPU to analyse images of the salmons made by the camera, to differentiate between individual sea lice present on each of the said salmons and the salmons themselves, and to assess the number of sea lice present on the salmons. For this, the CPU makes use of a memory 202 which via line 201 forms a part of the CPU as a whole. Data is reported via lines 203 and 205 to the regulating authorities 204 and/or farmer 206 respectively.

FIG. 3

FIG. 3 shows a device 100 according to the invention, spatially fixed with regard to the walls of a sea pen 300 submerged in the sea 301. The device 100 is coupled to an anchor 401 that is attached to the bottom of the sea pen 300. Next to this, the device is coupled via two damped lines 402 and 402' to sites of the wall of the pen near the surface of the sea. This makes sure that the device will not bounce with respect to the pens itself, thereby increasing the chance that salmons will be guided along the imaging track.

The invention claimed is:

1. Method for automatic sea lice monitoring in fish aquaculture, the method comprising:
   submerging a camera (4) in a sea pen (300) comprising fish,
   using the camera to make an image of at least one of said fish,
   analysing the image to differentiate between individual sea lice present on the fish and the fish itself,
   assessing the number of sea lice present on the fish,
characterised in that the camera is attached to a device (1, 10, 100) for guiding the salmon along an imaging track (5), the camera being directed to the track; and wherein the device comprises a radial enclosure (11, 101) to confine the track.

2. A method according to claim 1, wherein the enclosure has a diameter or a diagonal having a length that is 90-150% of the girth of the fish.

3. A method according to claim 1, characterised in that the enclosure is circular enclosure.

4. A method according to claim 1, characterised in that the enclosure is endless along its circumference.

5. A method according to claim 1, characterised in that the enclosure is a circular frame (101).

6. A method according to claim 1, characterised in that the device is spatially fixed with regard to one or more walls of the sea pen.

7. A method according to claim 1, characterised in that the device comprises at least two cameras directed to the track.

8. A method according to claim 1, characterised in that the device is provided with a thermometer (6) to record sea water temperature at the time the image is made.

9. A method according to claim 1, characterised in that in addition to the number of sea lice present on the fish, the size of these lice is assessed.

10. A method according to claim 1, wherein the fish is salmon.

11. A system for use in salmon aquaculture to automatically monitor and report sea lice presence on fish, the system comprising
   a central processing unit (CPU; 200)
   connected to the CPU a camera submerged in a sea pen comprising the fish, the camera being devised to make images of said fish, wherein the camera is attached to a device for guiding the fish along an imaging track of this device, the camera being directed to the track wherein the system comprises a radial enclosure (11, 101) to confine the track,
   imaging software running on the CPU to analyse images of the fish made by the camera, to differentiate between individual sea lice present on each of the said fish and the fish themselves, and to assess the number of sea lice present on the fish,
   a reporting unit (204, 206) connected to the CPU, to display a results corresponding to said assessing.

12. The system of claim 11, wherein the fish is salmon.

13. A device for making images of fish present in a sea pen, the device comprising a camera and a track for guiding a fish through the device, the device comprising an enclosure that confines the track, wherein the camera is attached to the enclosure and is directed to the track, wherein the enclosure is a radial enclosure (11, 101) to confine the track.

14. A device according to claim 13, wherein the enclosure has a diameter or a diagonal having a length that is 90-150% of the girth of the fish.

15. A device according to claim 13, wherein the enclosure is circular enclosure.

16. A device according to claim 13, wherein the enclosure is endless along its circumference.

17. A device according to claim 13, wherein the enclosure is a circular frame (101).

18. A device according to claim 13 wherein the fish is salmon.

* * * * *